Patented Dec. 11, 1945

2,390,758

UNITED STATES PATENT OFFICE 2,390,758

METHOD OF PRODUCING A SIMULATED METALLIC COATING

Eric Clifton Wahlberg, Stamford, Conn., assignor to Electrolux Corporation, New York, N. Y., a corporation of Delaware No Drawing. Application July 1, 1942, Serial No. 449,351

1 Claim. (Cl. 117—72)

This invention relates to coating compositions and methods of applying such compositions.

One object of the invention is to produce on any desired surface a metallic appearance. The finish may be dull or bright, as desired, and the particular metal imitated may be varied.

My invention consists of one or another of two preliminary steps and a second coating step which is followed thereafter by a third and final step.

According to one embodiment of my invention, a surface is first covered with an air drying lacquer. This surface is then allowed to dry. Alternatively, a coat of oven baked lacquer, such as urea formaldehyde primer may be applied. In either case, the lacquer is opaque and the shade or color chosen for this preliminary coat depends upon the metal which it is desired to imitate.

Subsequent to either of the two preliminary steps above described, the surface is sprayed with a mixture of clear lacquer, pearl essence, and lacquer thinner. When dry, the resulting finish is that of dull metal.

For the fourth and final step the surface is next sprayed with lacquer thinner. This effects a lustrous finish to the surface without affecting its metallic appearance, and brings out the full tonal value of the pearl essence deposited by the previous step.

As one example of a composition that may be used for the preliminary coat, I suggest a combination of clear lacquer and suitable pigments of known types producing a very light grey shade. After the finishing coat is applied, this will result in a finish having the appearance of aluminum.

The finishing coat that is applied is the same regardless of the undercoat and preferably consists of clear lacquer to which has been added a composition of fish scales known as pearl essence. Alternatively, there may be substituted for the pearl essence a product comprising gun-cotton suspended in clear lacquer. The proportions that have been found best are: one ounce pearl essence; one pint clear lacquer to one part of which mixture has been added two parts of lacquer thinner.

The preliminary coat may be applied in any desired manner but the second coat should be sprayed on for best results. The reason for this is that the fish scales will not be evenly distributed over the surface unless applied with a sprayer. Furthermore, if an air drying lacquer is used for the undercoat, the thinner of the second coat may cut the undercoat, causing a mixture of the two. If the undercoat is composed of a baked lacquer and the final coat is sprayed on, the best results are achieved.

While a slight amount of pigment may be added to the second coat to produce the desired metallic shade, it is best if all of the pigment is in the undercoat since pigment in the final coat tends to hide the fish scales of the pearl essence. However, if the material being coated is a metal having a light surface such as a steel stamping, it may be desirable to eliminate the undercoat and to rely on the color of the steel in combination with a slight amount of pigment mixed with the pearl essence coat to give the desired appearance imitating some other metal.

In conclusion, it is seen that my invention consists broadly in combining a surface having a suitable color—either naturally or artificially due to an undercoat of pigmented lacquer—with a covering of pearl essence or its equivalent and clear lacquer, and in spraying the resultant surface with thinner. The effect of the final application of thinner is to bring out the full value of the pigment such as the pearl essence of the fish scales inasmuch as the thinner has the ability to reduce the surface covering of lacquer over such pigment to a minimum.

I claim:

The method of imparting to a surface of an article a bright metallic appearance which includes, a preliminary step of applying to the surface of the article a baking lacquer under-coating comprising urea-formaldehyde and a colored pigment of a selected shade or color, baking said under-coating, then applying a second coating comprising a mixture of pearl essence, clear lacquer and lacquer thinner by spraying the same over said first coating, and after said second coating is dry for the final step spraying the coated surface with lacquer thinner to reduce the thickness of the lacquer over the pearl essence and thereby effect a lustrous metallic finish on the surface.

ERIC CLIFTON WAHLBERG.